Dec. 23, 1952 D. PERINONI ET AL 2,622,824
FISHING REEL
Filed June 17, 1948 2 SHEETS—SHEET 1

INVENTORS
Dominic Perinoni
BY Edward J. Perinoni

A. Schapp
ATTORNEY

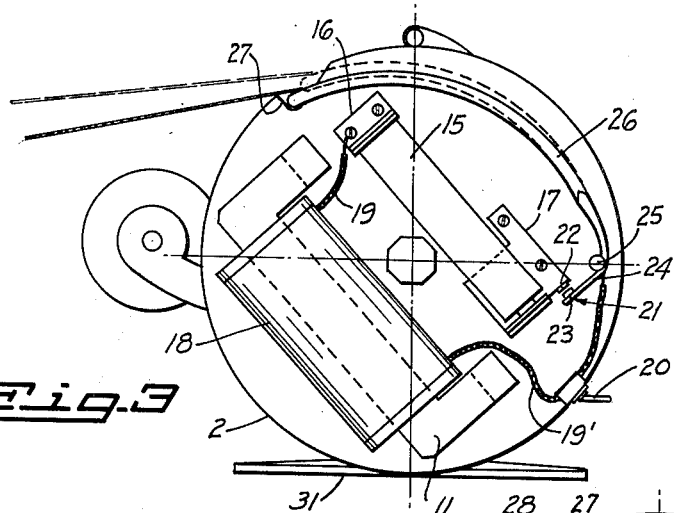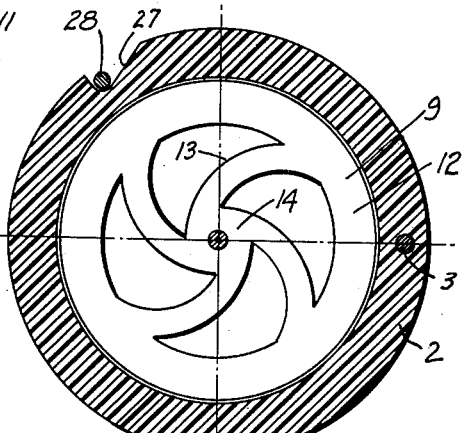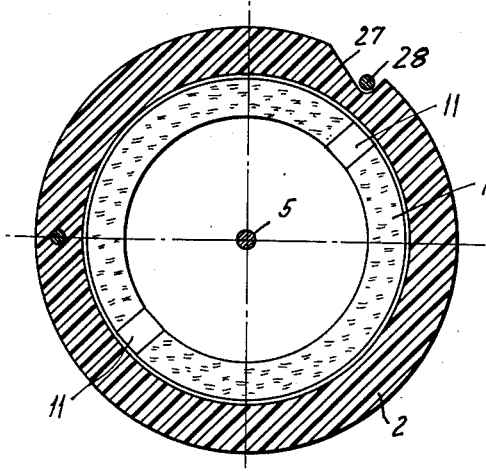

Patented Dec. 23, 1952

2,622,824

UNITED STATES PATENT OFFICE 2,622,824

FISHING REEL

Dominic Perinoni, Los Gatos, and Edward J. Perinoni, Santa Clara, Calif.

Application June 17, 1948, Serial No. 33,606

7 Claims. (Cl. 242—84.5)

The present invention relates to improvements in fishing reels, and its principal object is to provide electro-magnetic means in combination with a fishing reel to prevent backlash in casting operations.

It is further proposed to provide a brake mechanism in connection with a fishing reel, and electro-magnetic means for setting the brake, the said electro-magnetic means becoming operative automatically when a slack develops in the line during a casting operation.

It is further porposed to arrange the electromagnetic means in such a manner that it forms a simple, self-contained, compact unit with the fishing reel, allowing all drag either by thumb pressure or mechanical means, to be eliminated and ensuring a long life for the reel.

It is further proposed in the present invention to arrange the electro-magnetic brake means in such a manner that all casting operations may be carried out with the spool in a state of free wheeling.

Further objects and advantages of our invention will appear as the specification proceeds, and the novel features of our invention will be fully defined in the claims attached hereto.

Figure 1:
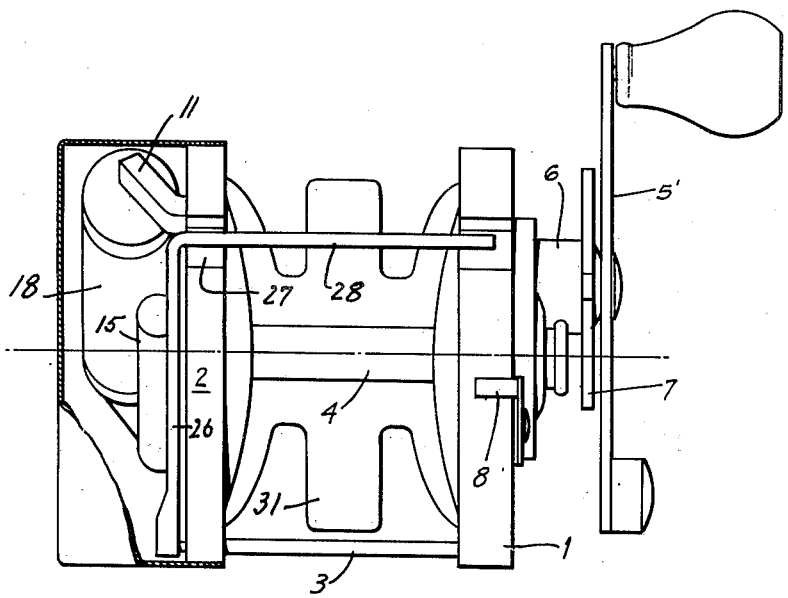
Figure 2:
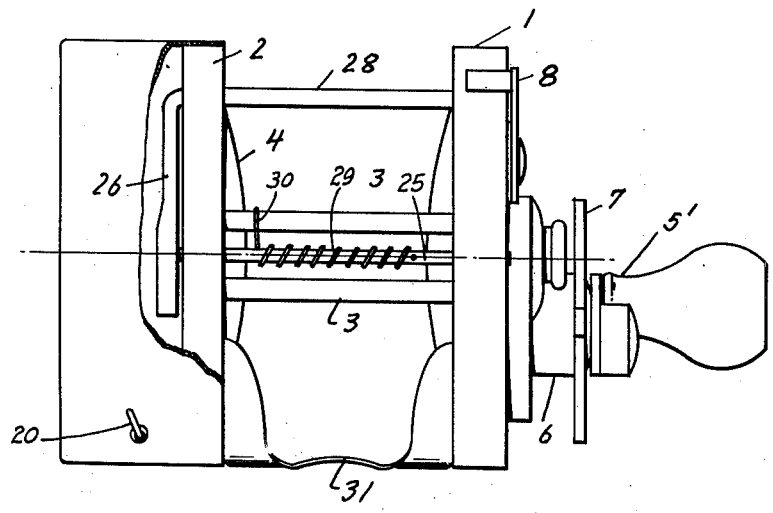

The preferred form of our invention is illustrated in the accompanying drawing, in which Figure 1 shows a top plan view of our improved fishing reel, certain portions being broken away to disclose the interior;

Figure 2, a rear view of the same with certain portions broken away;

Figure 3, an end view of the reel, with the housing omitted;

Figure 4, a fragmentary central section through one end portion of the reel;

Figure 5, a section taken along line 5—5 of Figure 4; and

Figure 6, a section taken along line 6—6 of Figure 4.

While we have shown only the preferred form of our invention, we wish to have it understood that various changes and modifications may be made within the scope of the claims attached hereto without departing from the spirit of the invention.

Referring to the drawings in detail, our fishing reel, apart from the features hereinafter described, may be made of conventional form, and is here shown as comprising two cylindrical end members 1 and 2 held in spaced and co-axial relation by means of suitable spacing members 3 and having a spool 4 for a fishing line axially supported therebetween, the spool being mounted on a shaft 5 which latter is suitably supported in bearings mounted in the end members in a conventional manner.

The spool is conventionally operated by means of a handle 5' connected to the shaft through suitable gearing accommodated in a housing 6, the operating mechanism including a tension adjusting spider 7 and a free wheeling adjustment indicated at 8. All of this operating mechanism is mounted on the frame member 1.

Our invention has particular reference to an electro-magnetic means for operating a brake mechanism in such a manner that the brake automatically becomes active when a slack develops in the line during casting operations.

Our brake mechanism comprises in its principal features a spring steel disc 9 mounted upon the shaft 5 immediately adjacent one end of the spool, a brake lining 10 mounted upon the inner face of the end frame member 2, which is recessed as shown in Figure 4 for receiving the same, and an electro-magnet 11 mounted upon the outside of the frame member for drawing the rim of the disc into frictional contact with the brake lining when the electro-magnet is energized.

The disc 9 is illustrated particularly well in Figure 5 and comprises a rim section 12 and a number of spokes 13 connecting the rim section to a hub section 14. The entire disc is relatively thin and flexible and is normally tensioned to bring the rim into the plane of the hub. It is sufficiently flexible, however, to allow the rim to be drawn toward the brake lining by the electro-magnet when the latter is energized.

The brake lining is illustrated particularly well in Figure 6 and is preferaby made in two segments, as shown, the spacing between the two segments being taken up by the legs or poles of the electro-magnet.

The outer face of the end frame member 2 also has a battery 15 mounted thereon between clips 16 and 17, the clips being connected to the positive and negative terminals of the battery. The clip 16 is connected to the winding 18 of the electro-magnet by means of a wire 19. The clip 17 is connected to the winding of the electromagnet by means of a wire 19', which includes a manually operated switch 20 and an automatically operated switch 21, including a fixed contact 22 and a movable contact 23 mounted upon the end of an arm 24 secured upon a post 25 pivoted in the end plates. The movable contact 23 is operated by means of an extension arm 26 fixed with respect to the arm 24 and extending in substantially parallel relation to the rim of the end frame member 2 through a considerable portion thereof as shown in Figure 3 until its free end reaches a pair of registering notches 27 in the rims of the two frame members.

The free end of the extension 26 terminates in a transverse bar 28 extending across the spool and adapted to rest in the two notches 27. A spring 29 mounted on the pivoted post 25 and anchored to one of the spacing members as shown at 30 tends to normally lift the bar 28 out of the notches and to urge the contact 23 upon the fixed contact 22 so as to normally keep the switch 21 closed for energizing the electro-magnet 11 and for setting the brake.

The entire fishing reel is mounted upon a fishing rod by means of a conventional base 31, and the switch operating members heretofore described are positioned with respect to the base as particularly well shown in Figure 3 in such a manner that the transverse bar 28 is disposed slightly forward of the vertical transverse plane of the reel. With respect to the operation of the device, the transverse bar 28 is mounted in such a manner that when the line is cast and is held taut by the sinker, the line bears down on the bar 28 and forces the same into the notches 27 for opening the switch 21. Thus, as long as the line is taut the brake mechanism hereinbefore described does not in any way interfere with casting operations.

If, however, a slack develops in the line it fails to bear down on the bar 28 and allows the latter to rise out of the notches under the influence of the spring 29, thereby closing the switch 21, energizing the magnet and drawing the rim of the spring disc 9 toward and into frictional contact with the brake band 10. This automatically stops the spool from rotating and thus prevents backlash in immediate response to the slackening of the line.

It will be noted that the extension 26 is very long as compared with the short arm 24 which makes the device very sensitive in its response to the tightening and the slackening of the line.

Since the switch 21 is normally closed, manually operated switch 20 is provided for opening the circuit when the device is not in use.

The amount of current used in the operation of the electro-magnet is very small, and a small battery will be sufficient to operate the device and will last a long time.

We find that with our electro-magnetic brake mechanism casting operations are greatly facilitated. In most reels used at the present time it is necessary to apply some sort of a drag during casting operations, either by thumbing or by providing a mechanical drag, and it is obvious that any drag of this character limits the distance of the cast.

With our electro-magnetic brake mechanism all danger of backlash is eliminated on account of its immediate response to any slackening of the line, and it is perfectly feasible to use the spool in absolutely free wheeling condition. Under these circumstances it is possible, as we have found by practical experience, to cast farther than it is possible in reels where a drag has to be applied during casting operations.

We claim:

1. In combination, a fishing reel comprising a pair of end members and a spool revolvable therebetween, the spool having a line thereon adapted for casting operations, a brake lining mounted on one of the end members, a flexible disc fixed with respect to the spool and having a rim of magnetizable material confronting the brake lining, an electric battery mounted upon the reel, an electro-magnet mounted upon said end member, an electric circuit including the battery and the electro-magnet, and means operable in response to a slack developed in the line during casting operations for rendering the circuit active to cause the electro-magnet to attract said rim for braking action.

2. In combination, a fishing reel comprising a pair of end members and a spool revolvable therebetween, the spool having a line thereon adapted for casting operations, a brake lining mounted on one of the end members, a flexible disc fixed with respect to the spool and having a rim of magnetizable material confronting the brake lining, an electric battery mounted upon the reel, an electro-magnet mounted upon said end member, an electric circuit including the battery and the electro-magnet, and means operable in response to a slack developed in the line during casting operations for rendering the circuit active to cause the electro-magnet to attract said rim for braking action, the said means comprising a switch member forming part of the circuit and positioned for operation by the cast line.

3. In combination, a fishing reel comprising a pair of end members and a spool revolvable therebetween, the spool having a line thereon adapted for casting operations, a brake lining mounted on one of the end members, a flexible disc fixed with respect to the spool and having a rim of magnetizable material confronting the brake lining, an electric battery mounted upon the reel, an electro-magnet mounted upon said end member, an electric circuit including the battery and the electro-magnet, a switch in the circuit biased for normal closing to render the circuit active to cause the electro-magnet to attract the rim to the brake lining for braking action, and an operating member for the switch projecting across the frame members, the operating member being positioned so as to be subject to line pressure in casting operations for opening the switch as long as the line is held under tension.

4. In combination, a fishing reel comprising a base adapted for securing upon a fishing pole, a frame rising from the base and including a pair of circular end members, a spool revolvable between the end members and having a line thereon adapted for casting operations, cooperative brake members on the spool and one of the end members comprising a brake lining mounted on said end member and a flexible disc fixed with respect to the spool and having a rim of magnetizable material confronting the brake lining, electro-magnetic means for operating the rim including an electric circuit, a post mounted in said end member rearwardly of the vertical plane of the spool axis and near the periphery of said end member, a switch in said circuit mounted upon the end member near the post and including a movable contact swingable on the axis of the post, an arcuate operating arm for the movable contact extending from the post forwardly along the outer edge of the end member to a point forwardly of said vertical plane, and a bar secured upon the end of the operating arm and extending across the end members to be depressed by the line when the latter is held taut in a casting operation for opening the switch, the latter having means tending to close the same for setting the brake when a slack develops in the line.

5. In combination, a fishing reel comprising a base adapted for securing upon a fishing pole, a frame rising from the base and including a pair of circular end members, a spool revolvable between the end members and having a line thereon adapted for casting operations, cooperative brake members on the spool and one of the end members comprising a brake lining mounted on said end member and a flexible disc fixed with respect to the spool and having a rim of magnetizable material confronting the brake lining, electro-magnetic means for operating the rim including an electric circuit, a post mounted in said end member rearwardly of the vertical plane of the spool axis and near the periphery of said end member, a switch in said circuit mounted upon the end member near the post and including a movable contact swingable on the axis of the post, an arcuate operating arm for the movable contact extending from the post forwardly along the outer edge of the end member to a point forwardly of said vertical plane, and a bar secured upon the end of the operating arm and extending across the end members to be depressed by the line when the latter is held taut in a casting operation for opening the switch, the latter having means tending to close the same for setting the brake when a slack develops in the line, and the end members having a rest located for supporting the bar when the latter is depressed by the line.

6. In combination, a fishing reel comprising a base adapted for fastening upon a fishing rod, a frame rising from the base and including a pair of circular end members, a spool revolvable between the end members and having a line thereon adapted for casting operations, a brake mechanism between the spool and one of the end members comprising a brake lining mounted on said end member and a flexible disc fixed with respect to the spool and having a rim of magnetizable material confronting the brake lining, electro-magnetic means for moving the rim of the disc into engagement with the brake lining for normally setting the brake mechanism, and line-operated means for releasing the brake mechanism, comprising a switch in the electromagnetic means including an arcuate operating arm pivoted to said end member near its periphery and rearwardly of the vertical plane of the spool axis and extending along the periphery across said plane to a point forwardly of the plane, and a bar secured upon the free end of the arm to extend across the frame so as to be depressed by the line while the latter is kept taut in a casting operation.

7. In combination, a fishing reel comprising a base adapted for fastening upon a fishing rod, a frame rising from the base and including a pair of circular end members, a spool revolvable between the end members and having a line thereon adapted for casting operations, a brake mechanism between the spool and one of the end members comprising a brake lining mounted on said end member and a flexible disc fixed with respect to the spool and having a rim of magnetizable material confronting the brake lining, electro-magnetic means for moving the rim of the disc into engagement with the brake lining for normally setting the brake mechanism, and line-operated means for releasing the brake mechanism, comprising a switch in the electromagnetic means including an arcuate operating arm pivoted to said end member near its periphery and rearwardly of the vertical plane of the spool axis and extending along the periphery across said plane to a point forwardly of the plane, and a bar secured upon the free end of the arm to extend across the frame so as to be depressed by the line while the latter is kept taut in a casting operation, the frame having a rest for the bar within the confines of the end members to limit movement of the bar in response to line pressure.

DOMINIC PERINONI.
EDWARD J. PERINONI.

REFERENCES CITED

The following references are of record in the file of this patent:

UNITED STATES PATENTS

| Number | Name | Date |
| --- | --- | --- |
| 506,094 | Boardman | Oct. 3, 1893 |
| 1,286,331 | James | Dec. 3, 1918 |
| 1,383,953 | James | July 5, 1921 |
| 1,892,541 | Smelser | Dec. 27, 1932 |
| 1,990,643 | Fankboner | Feb. 12, 1935 |
| 1,995,722 | Smith | Mar. 26, 1935 |
| 2,145,929 | Herman | Feb. 7, 1939 |
| 2,262,462 | Marqis, Jr. | Nov. 11, 1941 |

FOREIGN PATENTS

| Number | Country | Date |
| --- | --- | --- |
| 25,100 of 1904 | Great Britain | Sept. 28, 1905 |
| 396,814 | Great Britain | Aug. 17, 1933 |
| 396,818 | Great Britain | Aug. 17, 1933 |